United States Patent
Luo et al.

(10) Patent No.: US 10,682,715 B2
(45) Date of Patent: Jun. 16, 2020

(54) METHOD FOR MATERIAL RECOVERY IN ELECTROEROSION MACHINING

(71) Applicant: General Electric Company, Schenectady, NY (US)

(72) Inventors: Yuanfeng Luo, Rexford, NY (US); Steven Robert Hayashi, Schenectady, NY (US); Andrew Lee Trimmer, Latham, NY (US); Dale Robert Lombardo, Clifton Park, NY (US); John Anthony Vogel, Charlton, NY (US)

(73) Assignee: General Electric Company, Schenectady, NY (US)

( * ) Notice: Subject to any disclaimer, the term of this patent is extended or adjusted under 35 U.S.C. 154(b) by 592 days.

(21) Appl. No.: 14/723,987

(22) Filed: May 28, 2015

(65) Prior Publication Data

US 2016/0346855 A1    Dec. 1, 2016

(51) Int. Cl.
*B23H 7/10* (2006.01)
*B23H 11/00* (2006.01)
(Continued)

(52) U.S. Cl.
CPC ............ *B23H 7/101* (2013.01); *B23H 9/14* (2013.01); *B23H 11/00* (2013.01); *B23H 3/00* (2013.01)

(58) Field of Classification Search
CPC .......... B23H 11/00; B23H 3/00; B23H 7/101; B23H 9/14; B23H 5/04; B23H 5/06; B23H 5/08; B23H 7/22; B23H 1/10; B23H 3/04
(Continued)

(56) References Cited

U.S. PATENT DOCUMENTS

| 3,340,166 A | 9/1967 | Trager |
| 4,213,834 A * | 7/1980 | Semashko ............... B23H 3/02 205/642 |

(Continued)

FOREIGN PATENT DOCUMENTS

| CN | 102896383 A | 1/2013 |
| CN | 202684248 U | 1/2013 |

(Continued)

OTHER PUBLICATIONS

European Search Report and Opinion issued in connection with Related EP Application No. 16171137.9 dated Oct. 17, 2006.
(Continued)

*Primary Examiner* — Serkan Akar
*Assistant Examiner* — Chris Q Liu
(74) *Attorney, Agent, or Firm* — Ziolkowski Patent Solutions Group, SC; Jean K. Testa

(57) ABSTRACT

A method for electroerosion machining includes providing an electrode assembly comprising an electrode body having a tube-shaped body that defines a hollow interior and one or more inserts affixed to the electrode body to form a cutting surface on the electrode assembly, positioning the electrode assembly adjacent a workpiece to be machined, and providing power to the electrode assembly so as to energize the electrode assembly, with the electrode assembly and the workpiece being at opposite electrical polarities. The method also includes advancing the electrode assembly through the workpiece, with a working gap being maintained between the inserts and the workpiece across which a pulse electric current is passed to remove material from the workpiece, wherein, upon advancing the electrode assembly through the workpiece, a core is formed that is completely separated from a remainder of the workpiece and is contained within the hollow interior of the electrode body.

14 Claims, 3 Drawing Sheets

(51) Int. Cl.
*B23H 9/14* (2006.01)
*B23H 3/00* (2006.01)

(58) Field of Classification Search
USPC ..... 219/68, 69.1, 69.11, 69.12, 69.13, 69.14, 219/69.15, 69.16, 69.17, 69.18, 69.19, 219/69.2
See application file for complete search history.

(56) References Cited

U.S. PATENT DOCUMENTS

| | | | |
|---|---|---|---|
| 4,302,657 | A | 11/1981 | Turelli et al. |
| 6,204,466 | B1 * | 3/2001 | Tabor ................. B23H 1/04 219/69.17 |
| 6,413,407 | B1 | 7/2002 | Bruns et al. |
| 6,858,125 | B2 | 2/2005 | Wei et al. |
| 7,824,526 | B2 | 11/2010 | Yuan et al. |
| 8,236,162 | B2 | 11/2012 | Zhan et al. |
| 8,471,167 | B2 * | 6/2013 | Luo ................... B23H 1/04 205/686 |
| 2003/0019844 | A1 | 1/2003 | Shih |
| 2005/0127042 | A1 * | 6/2005 | Hastilow ............. B23H 7/04 219/69.17 |
| 2005/0218089 | A1 | 10/2005 | Wei et al. |
| 2008/0142488 | A1 | 6/2008 | Luo et al. |
| 2009/0001053 | A1 | 1/2009 | Luo et al. |
| 2010/0126877 | A1 * | 5/2010 | Luo ................... B23H 5/06 205/686 |
| 2010/0320078 | A1 | 12/2010 | Yuan et al. |
| 2012/0211357 | A1 * | 8/2012 | Trimmer ............. B23H 1/08 204/275.1 |

FOREIGN PATENT DOCUMENTS

| | | |
|---|---|---|
| EP | 2489456 A2 | 8/2012 |
| FR | 1290734 A | 4/1962 |
| FR | 2416080 A1 | 8/1979 |
| GB | 2179959 A | 3/1987 |
| JP | 2003254332 A | 9/2003 |
| WO | 2013119372 A1 | 8/2013 |

OTHER PUBLICATIONS

European Search Report and Opinion issued in connection with corresponding EP Application No. 16170612.2 dated Oct. 17, 2006.
Walker et al., "The Blue Arch Machining Process," Oct. 2013, Paper Presented on Titanium Conference Proceedings, Titanium USA 2013, Caesars Palace, Las Vegas, Nevada, US, pp. 1-19.
Machine Translation and First Office Action and Search issued in connection with corresponding CN Application No. 201610359281.9 dated Oct. 26, 2018.

* cited by examiner

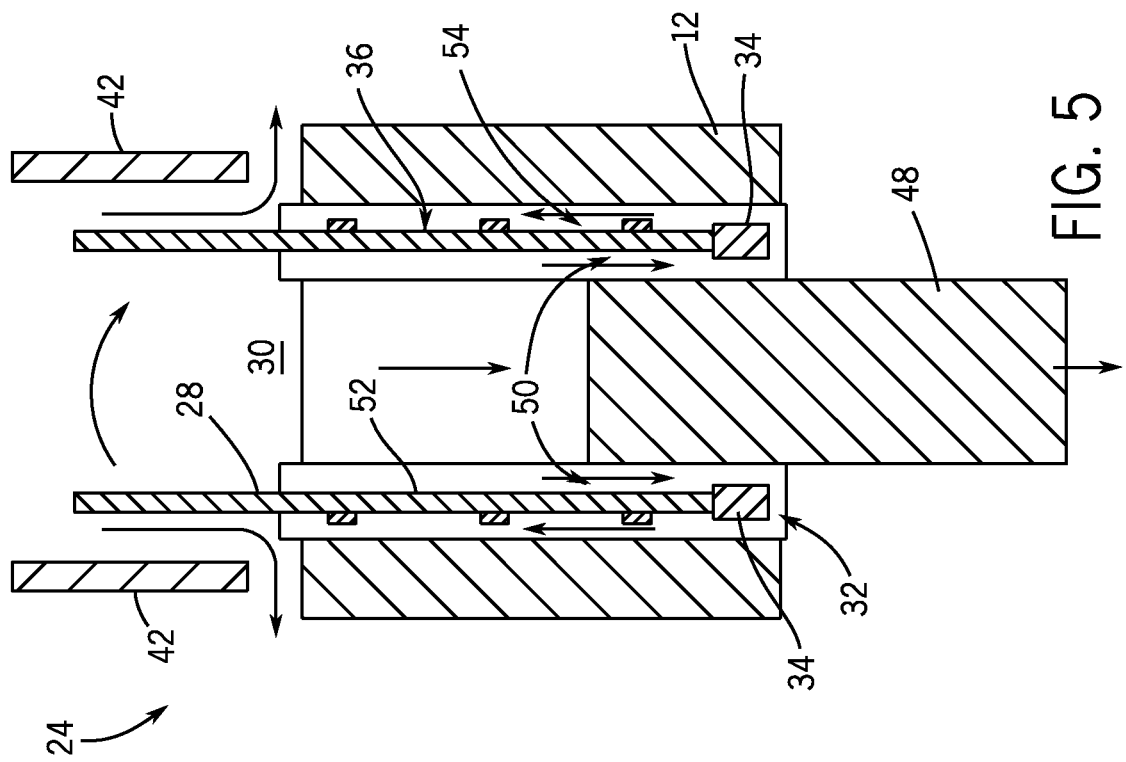
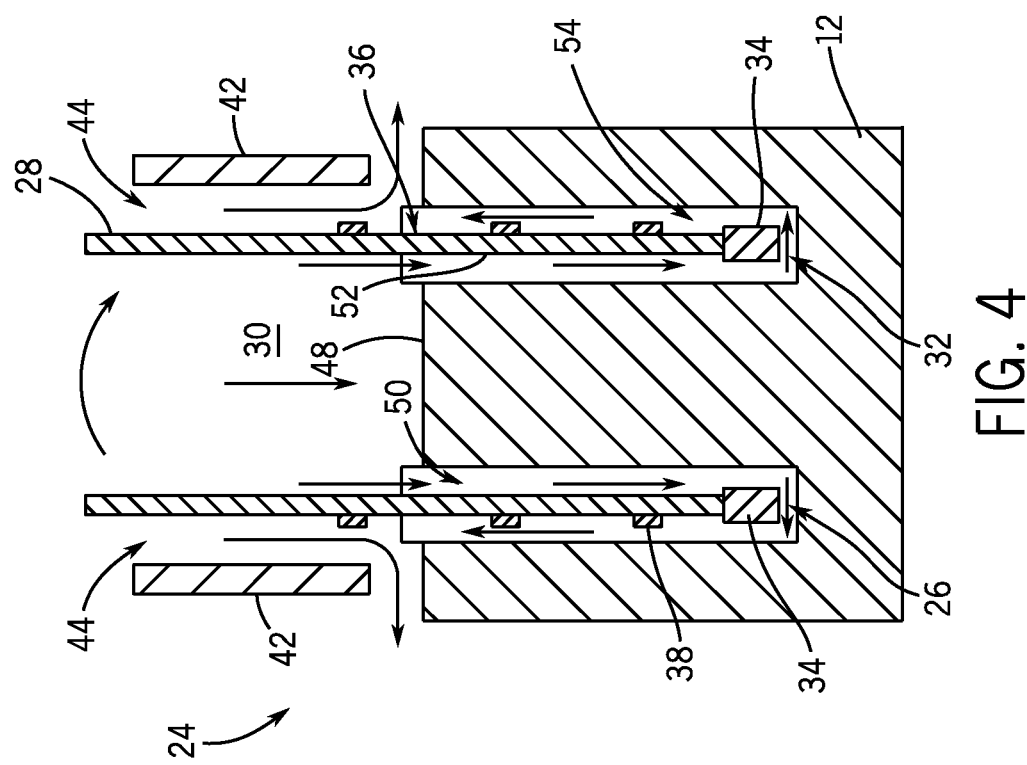

METHOD FOR MATERIAL RECOVERY IN ELECTROEROSION MACHINING

BACKGROUND OF THE INVENTION

Embodiments of the invention relate generally to electroerosion machines and, more particularly, to a tube-shaped electrode for electroerosion machines.

Electroerosion machining is a machining method that is generally used for machining hard metals or those that would be impossible to machine with other techniques such as using lathes, drills, or the like. Electroerosion machining can thus be used in trepanning or drilling operations in extremely hard steels and other hard, electrically conductive metals such as titanium, hastelloy, kovar, inconel, carbide, or the like. Certain electroerosion machining techniques utilize electrical discharge and spark eroding to provide a rough machining method that aggressively removes material (e.g., at a rate 10× that of standard electrical discharge machining) by a series of rapidly recurring electric arcing discharges between an electrode (the cutting tool) and the workpiece, in the presence of an energetic electric field. The electroerosion cutting tool is guided along the desired path very dose to the work but it does not touch the piece. Consecutive sparks produce a series of micro-craters on the workpiece and remove material along the cutting path by melting and vaporization. The workpiece forms the cathode and the tool, otherwise referred to as the electrode, forms the anode. The particles are washed away by the continuously flushing dielectric fluid.

The electrode for an electroerosion machine is generally manufactured from conductive materials such as graphite, brass, or copper. As noted above, a flow of dielectric fluid, such as a hydrocarbon oil, is pumped into the gap between the electrode and the workpiece to allow a path for the electrical discharge and to flush away debris from the arcing. A pulsating DC power supply is connected to supply the energy that provides the arcing between the electrode and the workpiece. The discharges travel through and ionize the dielectric fluid and sparks occur where the surfaces of the electrode and the workpiece are closest. The region in which the spark occurs is heated to such high temperatures that a small speck of the work surface is melted and removed from the workpiece, and is subsequently swept away by the flow of the dielectric fluid. This part of the workpiece is now below the average level of the workpiece surface so the next highest areas of the workpiece are removed next. These discharges occur hundreds or thousands of times per second so that gradually all of the area on the workpiece that is in communication with the electrode is eroded.

For the reasons mentioned above, electroerosion is useful in machining components for use in aeronautical and space applications. For example, electroerosion is used to machine cooling holes in super alloy components of gas turbine airfoils in circumstances where accessibility or hole shape complexity precludes the use of laser drilling, with such holes being formed via trepanning or drilling methods. Cooling holes are formed in the airfoil wall sections of nozzle guide vanes to enable cooling air fed, for example, from the engine compressor to pass from the hollow core of the nozzle guide vanes to form a thin film of cooling air over the airfoil surface, thereby protecting the airfoil from the effects of high temperature combustion gases.

However, one drawback to electromachining processes is that material recycling of the workpiece is difficult and expensive. That is, it is recognized that material recycling for expensive workpiece materials (e.g., titanium) is highly desirable; however, existing electroerosion techniques make recycling of the workpiece difficult as chips and shavings generated by electroerosion machining are difficult and expensive to recycle due to their small size and also due to oxidation thereof. Especially for electoerosion machining techniques utilized to provide a rough machining method that aggressively removes a large amount of material, material recycling is highly desirable based on the amount of material being machined.

Therefore, it is desirable to provide a means for recycling workpiece chips and shavings in electroerosion rough machining processes.

BRIEF DESCRIPTION OF THE INVENTION

In accordance with one aspect of the invention, a method for electroerosion machining includes providing an electrode assembly comprising an electrode body having a tube-shaped body that defines a hollow interior and one or more inserts affixed to the electrode body to form a cutting surface on the electrode assembly, positioning the electrode assembly adjacent a workpiece to be machined, and providing power to the electrode assembly so as to energize the electrode assembly, with the electrode assembly and the workpiece being at opposite electrical polarities. The method also includes advancing the electrode assembly through the workpiece, with a working gap being maintained between the one or more inserts and the workpiece across which a pulse electric current is passed to remove material from the workpiece, wherein, upon advancing the electrode assembly through the workpiece, a core is formed that is completely separated from a remainder of the workpiece and is contained within the hollow interior of the electrode body.

In accordance with another aspect of the invention, a rough machining method for long aspiration hole drilling includes providing an electrode assembly comprising a pipe-shaped electrode body defining a hollow interior and having a working end positionable adjacent a workpiece to be rough machined and one or more replaceable inserts affixed to the electrode body at the working end to provide a cutting surface. The method also includes energizing one of the workpiece and the electrode assembly as an anode and the other as a cathode and advancing the electrode assembly into the workpiece so as to generate a hole, with a core of workpiece material being formed within the hollow interior of the pipe-shaped electrode body as the electrode assembly advances into the workpiece. The method further includes circulating a cutting fluid across a working gap between the working end of the pipe-shaped electrode body and the workpiece as the electrode assembly advances into the workpiece. The core of workpiece material is separated from a remainder of the workpiece upon advancement of the electrode assembly through an entirety of the workpiece.

In accordance with yet another aspect of the invention, a method of manufacturing an electroerosion machining system includes providing an electrode assembly configured to machine a desired configuration in a workpiece, providing a power supply configured to energize the electrode assembly and the workpiece to opposite electrical polarities, and providing a working apparatus configured to move the electrode assembly relative to the workpiece. Providing the electrode assembly further includes providing a pipe-shaped electrode body defining a hollow interior sized to accommodate a core of workpiece material therein resulting from a hole drilling of the workpiece and attaching one or more replaceable inserts to the pipe-shaped electrode body at a working end thereof, the one or more replaceable inserts constructed so as to be selectively attachable and detachable from a working end of the pipe-shaped electrode body.

Various other features and advantages will be made apparent from the following detailed description and the drawings.

BRIEF DESCRIPTION OF THE DRAWINGS

The drawings illustrate embodiments presently contemplated for carrying out the invention.

In the drawings:

FIGS. 4 and 5 are cross-sectional views of the electrode assembly, taken along line 4-4, as the electrode assembly is advanced into the workpiece.

DETAILED DESCRIPTION

Embodiments of the invention provide an electrode assembly for electroerosion machines that provides for the recovery of chunks of a workpiece that result from an electroerosion machining process. The electrode assembly includes a pipe-shaped electrode body that is capable of receiving a chunk of workpiece material therein and a replaceable insert that is utilized for removal of material from the workpiece.

Figure 1:
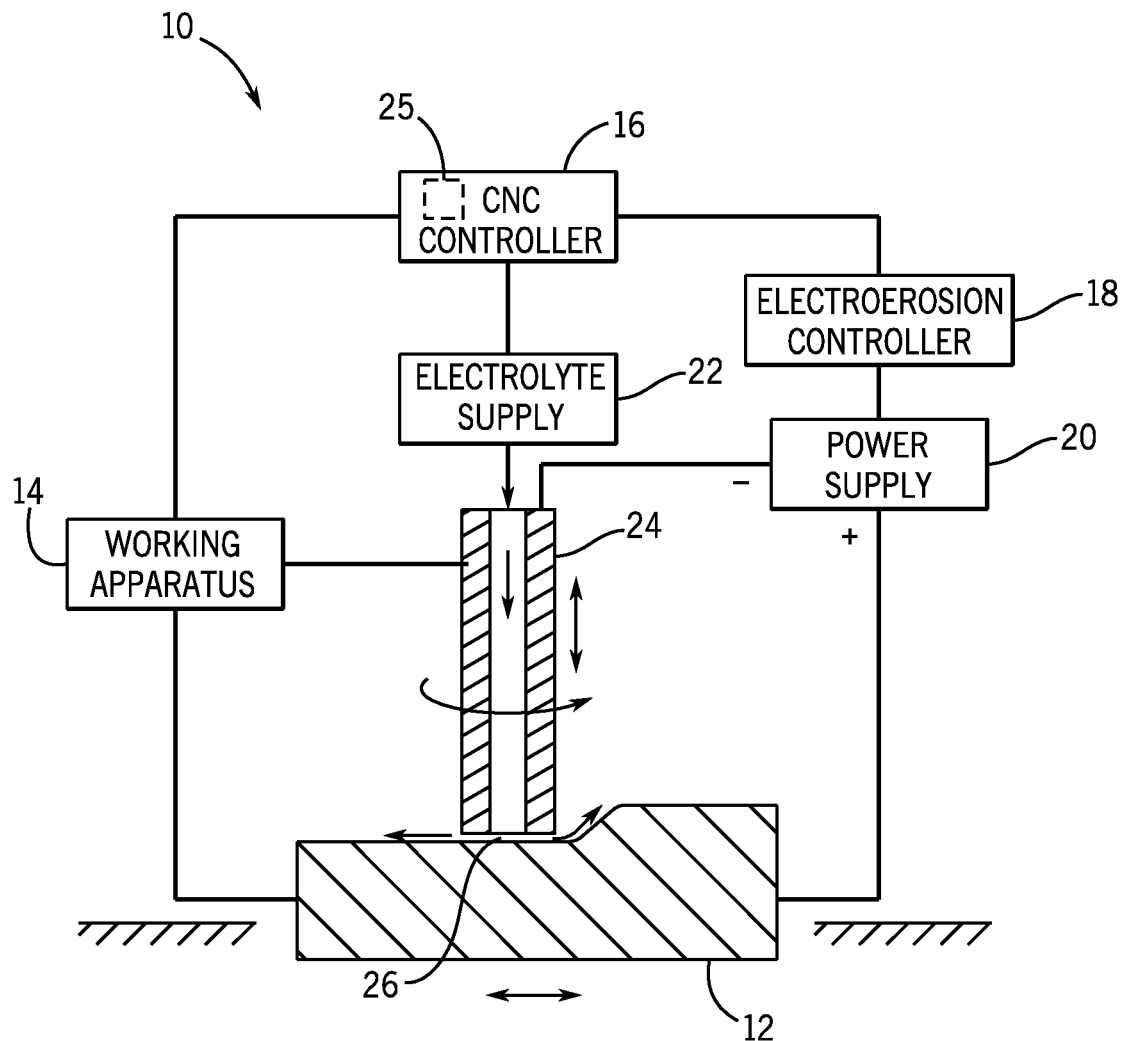
FIG. 1 is a schematic diagram of an electroerosion machining system according to an embodiment of the invention.

FIG. 1 illustrates a schematic diagram of an electroerosion machining system 10, such as a system for performing electrical discharge machining, in accordance with one embodiment of the invention. In an embodiment of the invention, the electroerosion machining system 10 is used to remove material from a workpiece 12 layer by layer to form a desired configuration. As illustrated in FIG. 1, the electroerosion machining system 10 comprises a numerical control (NC) or computer numerical control (CNC) device (not shown) including a working apparatus 14 and a CNC controller 16, an electroerosion controller 18, a power supply 20, an electrolyte supply 22, and an electrode assembly 24.

In embodiments of the invention, the NC or the CNC device can be used to perform traditional automated machining. In particular examples, the working apparatus 14 may comprise a machine tool or lathe including servomotors (not shown) and spindle motors (not shown), which are known to one skilled in the art. The electrode assembly 24 is mounted on the working apparatus 14 for performing electroerosion machining. Accordingly, the servomotors may drive the electrode assembly 24 and the workpiece 12 to move opposite to each other at a desired speed and path, and the spindle motors drive the electrode assembly 24 to rotate at a desired speed.

The CNC controller 16 comprises pre-programmed instructions based on descriptions of the workpiece 12 in a computer-aided design (CAD) and/or a computer-aided manufacturing (CAM), and is connected to the working apparatus 14 to control the working apparatus 14 to drive the electrode assembly 24 to move and/or rotate according to certain operational parameters, such as certain feedrates, axes positions, or spindle speeds, etc. In one non-limiting example, the CNC controller 16 may be a general CNC controller and comprise central processing units (CPU), read only memories (ROM), and/or random access memories (RAM), as known to one skilled in the art. Also, according to one embodiment, the CNC controller 16 may include a wear-calibrating program module 25 therein that functions to determine the condition of the electrode assembly 24 prior to or after machining, as will be described in greater detail below.

In the illustrated embodiment, the power supply 20 comprises a direct current (DC) pulse generator. The electrode assembly 24 and the workpiece 12 are connected to negative and positive poles of the power supply 20, respectively. Accordingly, in embodiments of the invention, the electrode assembly 24 may function as a cathode and the workpiece 12 may act as an anode. In other embodiments, the polarities on the electrode assembly 24 and the workpiece 12 may be reversed.

The electroerosion controller 18 is connected to the power supply 20 to monitor the status of the power supply 20. In one embodiment, the electroerosion controller 18 may comprise one or more sensors (not shown), such as a voltage and/or current measurement circuit for monitoring the status of voltages and/or currents in a gap 26 between the electrode assembly 24 and the workpiece 12. In other embodiments, the sensor(s) may be disposed in the power supply 20 or be disposed separately. In non-limiting examples, the electroerosion controller 18 may comprise a microprocessor or another computational device, a timing device, a voltage comparison device, and/or a data storage device etc. to be served as the sensor(s), as known to one skilled in the art. Additionally, the electroerosion controller 18 also communicates with the CNC controller 16 to control the power supply 20 and the movement of the working apparatus 14 holding the electrode assembly 24.

In one example, the electrolyte supply 22 may be in communication with and receive the pre-programmed instructions from the CNC controller 16 for passing an electrolyte between the electrode assembly 24 and the workpiece 12. Alternatively, the electrolyte supply 22 may be disposed separately. Thus, in electroerosion machining, the power supply 20 may pass a pulse electric current between the electrode assembly 24 and the workpiece 12 to remove material from the workpiece 12 layer by layer for forming a desired configuration while the electrolyte carries the removed material out of the gap 26.

Figure 3:
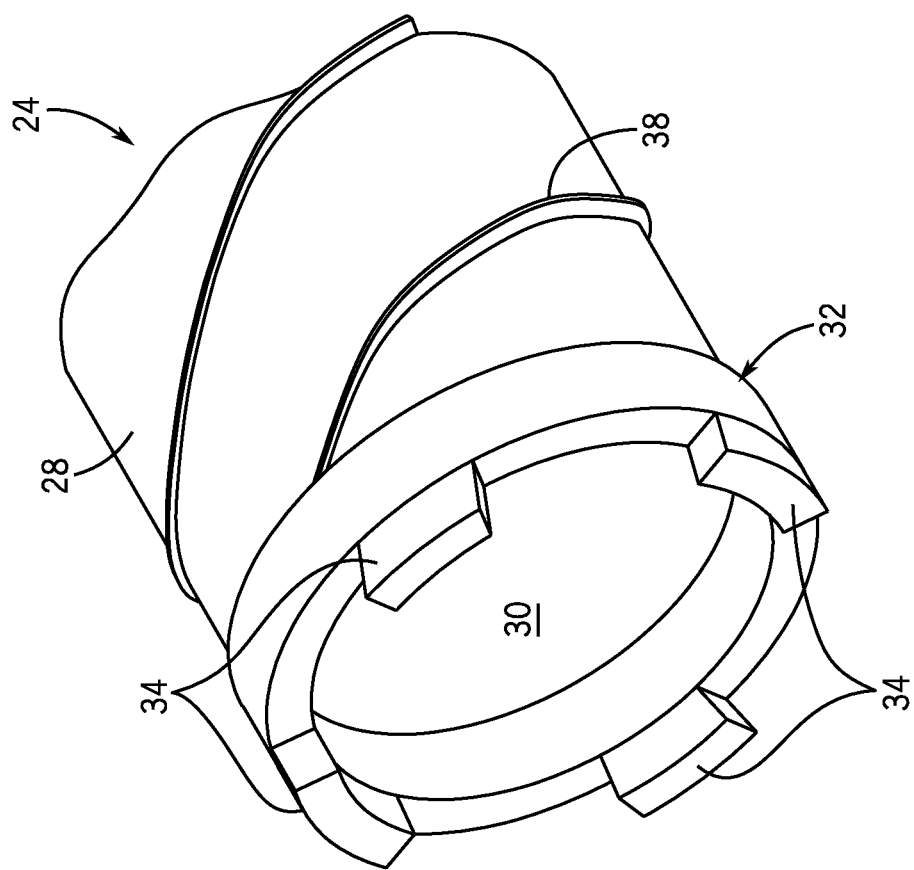
FIG. 3 is a perspective view of an electrode assembly of the electroerosion machining system of FIG. 1 according to an embodiment of the invention.
Figure 2:
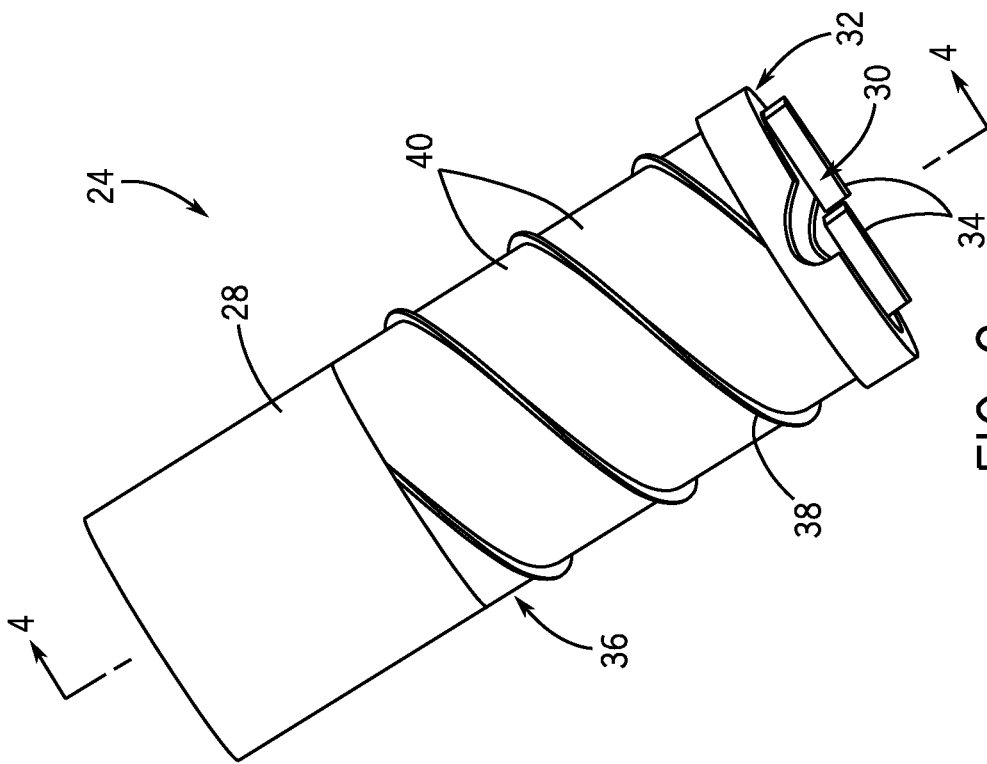
FIG. 2 is a perspective view of an electrode assembly of the electroerosion machining system of FIG. 1 according to an embodiment of the invention.

Referring now to FIGS. 2-5, the electrode assembly 24 is illustrated in greater detail according to exemplary embodiments. The electrode assembly 24 includes a tube or pipe-shaped electrode body 28 that defines a interior hollow portion 30. The electrode body 28 has a circular working face or end 32 positioned adjacent the workpiece 12, and one or more replaceable inserts 34 is affixed to the electrode body 28 at the working end 32 for performing the rough machining operation. In one embodiment, and as shown in FIG. 2, a single replaceable insert 34 is provided on the working end 32 of electrode body 28. However, in another embodiment, and as shown in FIG. 3, four replaceable inserts 34 are provided that are equidistantally spaced 90 degrees apart from one another about a perimmeter of the pipe-shaped electrode body 28.

The replaceable insert(s) 34 are constructed of a material having suitable properties (e.g., electrical conductivity, wear resistance, etc.) for removing material from the workpiece 12. In an exemplary embodiment, the replaceable inserts 34 are formed of a tungsten copper alloy (WCu), although other suitable materials could also be used to form the inserts. It is recognized that the replaceable insert(s) 34 of the electrode assembly 24 wear down during operation, and thus the replaceable insert(s) 34 are constructed so as to be selectively attachable and detachable from the working end 32 of the electrode body 28. The attachment of the replaceable insert(s) 34 to the electrode body 28 may be achieved via bolting of the inserts to the body, for example, or via any other suitable means by which the replaceable insert(s) 34 may be selectively attached and detached from the electrode body 28.

As can be seen in FIGS. 2 and 3, dimensions of the hollow interior 30 are much larger than the thickness of the wall of pipe-shaped electrode body 28, such that the hollow interior 30 is configured to receive a chunk or core of workpiece material resulting from a trepanning or drilling of the workpiece 12. In addition to the core of workpiece material that enters into the hollow interior 30 of the electrode body 28, addition shavings or debris of workiece material is forced outward and upward away from the electrode body 28 by electrolyte. As shown in FIG. 2, an outer surface 36 of the electrode body 28 includes a plurality of flutes 38 formed thereon that provide for removal of this workpiece debris away from the working end 32 of the electrode body 28. The flutes 38 are arranged in a spiral pattern on the outer surface 36 of the electrode body 28 so as to define flushing channels 40 through which electrolyte and workpiece debris are transferred away from the working end 32 of the electrode body 28.

As best shown in FIGS. 4 and 5, the electrode assembly 24 also includes a shield member 42 that is used to direct a flow of protective gas toward the workpiece 12 in order to prevent oxidation of the chunk/core of workpiece material that is received within the hollow interior 30 of the electrode body 28. The shield member 42 is positioned about a portion of the electrode body 28 (i.e., it does not extend all the way down to working end 32) and is spaced apart from the electrode body 28 to define a gas channel 44 through which a protective gas may be provided. In one embodiment, argon gas is forced down through the gas channel 44 formed by the shield member 42 and electrode body 28 in order to provide a protective environment in which oxidation of the chunk/core of workpiece material will be prevented—such that the chunk/core may be recyled.

Referring now to FIGS. 4 and 5, a designated trepanning or drilling toolpath in which electrode assembly 24 may be moved is shown. In performing a trepanning or drilling operation along the toolpath, the electrode assembly 24 spins and is advanced into the workpiece 12 along a path controlled by the CNC controller 16 (FIG. 1). A working gap 26 is maintained between the circular working 32 and inserts 34 of the electrode assembly 24 and the receding corresponding surface of the workpiece 12. The corresponding surface of the workpiece 12 is continuously eroded away with or without electrical arcs. Thus an annular groove or hole 46 and a core 48 are gradually formed. An inner gap 50 is defined between the core 48 and an inner surface 52 of the electrode body 28, and an outer gap 54 is defined between the outer surface 36 of the electrode body and a sidewall of the annular groove or hole 46. In one embodiment, the inner gap 50 is in the form of slots or channels formed in the electrode body 28.

During the rough machining operation, the electrolyte supply 22 continuously pumps cool and clean cutting fluid under high pressure into the electrode assembly 24 through the inner gap 50 between the core 48 and the electrode assembly 24. The cutting fluid flows across the working gap 26 between the advancing working face 32 of the electrode assembly 24 and the receding corresponding surface of the workpiece 12 and then is forced to flow out through the outer gap 54 between the electrode assembly 24 and the workpiece 12 and out through flushing channels 40 in the outer surface 36 of the electrode body 28, thereby taking away the shavings and the heat generated during the rough machining operation.

As shown in FIG. 5, after completion of the trepanning or drilling operation, a core 48 is left that is completely separated from a remainder of the workpiece 12. The core 48 is contained within the hollow interior 30 of the electrode body 28 and may be removed therefrom upon completion of the electroerosion operation such that the core 48 may be recycled—with the core 48 being protected via the argon gas that is caused to flow through the gas channel 44 formed by the shield member 42 and electrode body 28. Such recycling of the workpiece material is especially beneficial when the workpiece material being machined is an expensive material, such as titanium for example.

It is recognized that the replaceable inserts 34 of the electrode assembly 28 experience wear during operation, and thus the condition of the replaceable inserts 34 must be monitored in order determine when it is necessary to replace the replaceable inserts 34. As indicated above, a wear-calibrating program module 25 (FIG. 1) may be utilized to monitor a condition of the electrode assembly 28—and specifically a condition of the replaceable inserts 34. The wear-calibrating program module 25 may monitor a size (e.g., thickness) of the replaceable inserts 34, such as by calculating a wear value between the thickness of the replaceable inserts 34 prior to machining the workpiece and the thickness of the replaceable inserts 34 after machining of the workpiece and determining a remaining life of the replaceable inserts 34. The replaceable inserts 34 may then be removed and replaced (e.g., old inserts 34 unbolted from the electrode body 28 and new inserts 34 bolted to the electrode body 28) upon a determination by the wear-calibrating program module 25 that new inserts are required.

Beneficially, embodiments of the invention thus provide an electrode assembly that enables the recycling of chunks of workpiece material from an electroerosion operation. The electrode assembly includes a pipe-shaped electrode body that is capable of receiving a core or chunk of workpiece material therein, with the core being removed therefrom upon completion of the electroerosion operation such that the core may be recycled. The electrode assembly is constructed to provide a flow of argon gas to the workpiece to provide protection to the core/chunk of workpiece material and prevent oxidation thereof along the cutting or working face of the electrode assembly. Replaceable inserts on the working face of the electrode assembly are provided such that the electrode body remains intact, with the replaceable inserts being easily attached and detached from the electrode body as required. Accordingly, an electrode assembly is provided having increased longevity (with only the replaceable inserts needing to be regularly replaced) and that reduces the costs of recycling workpiece material.

According to one embodiment of the invention, a method for electroerosion machining includes providing an electrode assembly comprising an electrode body having a tube-shaped body that defines a hollow interior and one or more inserts affixed to the electrode body to form a cutting surface on the electrode assembly, positioning the electrode assembly adjacent a workpiece to be machined, and providing power to the electrode assembly so as to energize the electrode assembly, with the electrode assembly and the workpiece being at opposite electrical polarities. The method also includes advancing the electrode assembly through the workpiece, with a working gap being maintained between the one or more inserts and the workpiece across which a pulse electric current is passed to remove material from the workpiece, wherein, upon advancing the electrode assembly through the workpiece, a core is formed that is completely separated from a remainder of the workpiece and is contained within the hollow interior of the electrode body.

According to another embodiment of the invention, a rough machining method for long aspiration hole drilling includes providing an electrode assembly comprising a pipe-shaped electrode body defining a hollow interior and having a working end positionable adjacent a workpiece to be rough machined and one or more replaceable inserts affixed to the electrode body at the working end to provide a cutting surface. The method also includes energizing one of the workpiece and the electrode assembly as an anode and the other as a cathode and advancing the electrode assembly into the workpiece so as to generate a hole, with a core of workpiece material being formed within the hollow interior of the pipe-shaped electrode body as the electrode assembly advances into the workpiece. The method further includes circulating a cutting fluid across a working gap between the working end of the pipe-shaped electrode body and the workpiece as the electrode assembly advances into the workpiece. The core of workpiece material is separated from a remainder of the workpiece upon advancement of the electrode assembly through an entirety of the workpiece.

According to yet another embodiment of the invention, a method of manufacturing an electroerosion machining system includes providing an electrode assembly configured to machine a desired configuration in a workpiece, providing a power supply configured to energize the electrode assembly and the workpiece to opposite electrical polarities, and providing a working apparatus configured to move the electrode assembly relative to the workpiece. Providing the electrode assembly further includes providing a pipe-shaped electrode body defining a hollow interior sized to accommodate a core of workpiece material therein resulting from a hole drilling of the workpiece and attaching one or more replaceable inserts to the pipe-shaped electrode body at a working end thereof, the one or more replaceable inserts constructed so as to be selectively attachable and detachable from a working end of the pipe-shaped electrode body.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for electroerosion machining comprising:
    providing an electrode assembly comprising:
        an electrode body having a tube-shaped body that defines a hollow interior, the tube-shaped electrode body having a working end positionable adjacent a workpiece to be electroerosion machined; and
        one or more inserts affixed to the electrode body to form a cutting surface on the electrode assembly;
    positioning the electrode assembly adjacent the workpiece to be machined;
    directing a protective gas toward the cutting surface of the electrode body;
    providing power to the electrode assembly so as to energize the electrode assembly, with the electrode assembly and the workpiece being at opposite electrical polarities;
    advancing the electrode assembly through the workpiece, with a working gap being maintained between the one or more inserts and the workpiece across which a pulse electric current is passed to remove material from the workpiece, and wherein, upon advancing the electrode assembly through the workpiece, a core is formed that is completely separated from a remainder of the workpiece and is contained within the hollow interior of the electrode body;
    passing an electrolyte from an electrolyte supply down through the electrode body, such that the electrolyte flows into the working gap between the electrode assembly and the workpiece;
    channeling the electrolyte and workpiece debris resulting from the removal of workpiece material through flushing channels on an outer surface of the electrode body to transfer the workpiece debris away from the cutting surface of the electrode body, the flushing channels being defined by a plurality of flutes formed on the outer surface of the electrode body; and
    recycling the core upon separation thereof from the remainder of the workpiece, with the protective gas preventing oxidation of the core and enabling recycling thereof;
    wherein directing the protective gas comprises channeling the protective gas down through a gas channel defined by the electrode body and a shield member positioned about a portion of the electrode body and spaced apart therefrom, with the shield member not extending all the way down the electrode body to the working end.

2. The method of claim 1 wherein the plurality of flutes are arranged in a spiral pattern on the outer surface of the electrode body.

3. The method of claim 1 wherein the electrolyte is supplied down through the electrode body via a gap formed in the electrode body, the gap comprising slots or channels formed in the electrode body.

4. The method of claim 1 wherein advancing the electrode assembly through the workpiece comprises advancing the workpiece in performing a long aspiration hole drilling process.

5. The method of claim 1 wherein providing the electrode assembly comprises selectively replacing the one or more inserts upon wearing of the one or more inserts, with the one or more replaceable inserts constructed so as to be selectively attachable and detachable from the electrode body.

6. The method of claim 5 wherein selectively replacing the one or more inserts comprises:
   monitoring a thickness of the one or more inserts via calculating a wear value between the thickness of the one or replaceable inserts prior to machining the workpiece and the thickness of the one or more replaceable inserts after machining of the workpiece; and
   determining a remaining life of the one or more replaceable inserts based on the calculated wear value.

7. The method of claim 5 wherein each of the one or more replaceable inserts is composed of a tungsten-copper alloy.

8. The method of claim 1 wherein providing the electrode assembly comprises attaching a plurality of replaceable inserts to the electrode body, with the plurality of replaceable inserts being spaced equidistantally about a perimeter of the electrode body.

9. A rough machining method for long aspiration hole drilling, the method comprising:
   providing an electrode assembly comprising:
      a pipe-shaped electrode body defining a hollow interior, the pipe-shaped electrode body having a working end positionable adjacent a workpiece to be rough machined; and
      one or more replaceable inserts affixed to the electrode body at the working end;
   energizing one of the workpiece and the electrode assembly as an anode and energizing the other of the workpiece and the electrode assembly as a cathode;
   advancing the electrode assembly into the workpiece so as to generate a hole, with a core of workpiece material being formed within the hollow interior of the pipe-shaped electrode body as the electrode assembly advances into the workpiece;
   directing a protective gas toward the working end of the pipe-shaped electrode body;
   pumping an electrolyte from an electrolyte supply down through a working gap between the working end of the pipe-shaped electrode body and the workpiece as the electrode assembly advances into the workpiece;
   channeling the electrolyte and workpiece debris resulting from the removal of workpiece material through flushing channels on an outer surface of the electrode body to transfer the workpiece debris away from the cutting surface of the electrode body, the flushing channels being defined by a plurality of flutes formed on the outer surface of the electrode body;
   recycling the core of workpiece material once the core is separated from a remainder of the workpiece, upon advancement of the electrode assembly through an entirety of the workpiece, with the protective gas preventing oxidation of the core of workpiece material and enabling recycling thereof;
   wherein directing the protective gas comprises channeling the protective gas down through a gas channel formed between the pipe-shaped electrode body and a shield member positioned about at least a portion of the electrode body and spaced apart therefrom, with the shield member not extending all the way down to the working end of the pipe-shaped electrode body.

10. The method of claim 9 wherein circulating the electrolyte across the working gap comprises supplying electrolyte down through the pipe-shaped electrode body via a gap formed in the pipe-shaped electrode body.

11. The method of claim 9 comprising removing workpiece debris away from the working end, wherein removing workpiece debris includes: pumping the electrolyte through the working gap; and channeling the electrolyte and workpiece debris resulting from the removal of workpiece material through flushing channels on an outer surface of the pipe-shaped electrode body, the flushing channels being defined by a plurality of flutes formed on the outer surface of the electrode body.

12. The method of claim 9 further comprising selectively replacing the one or more replaceable inserts on the pipe-shaped electrode body upon wearing of the one or more replaceable inserts to a thickness less than a minimal acceptable thickness value.

13. The method of claim 9 wherein each of the one or more replaceable inserts is composed of a tungsten-copper alloy.

14. A method of manufacturing an electroerosion machining system comprising:
   providing an electrode assembly configured to machine a desired configuration in a workpiece;
   providing a power supply configured to energize the electrode assembly and the workpiece to opposite electrical polarities; and
   providing a working apparatus configured to move the electrode assembly relative to the workpiece;
   wherein providing the electrode assembly comprises:
      providing a pipe-shaped electrode body defining a hollow interior sized to accommodate a core of workpiece material therein resulting from a hole drilling of the workpiece; and
      attaching one or more replaceable inserts to the pipe-shaped electrode body at a working end thereof, the one or more replaceable inserts constructed so as to be selectively attachable and detachable from a working end of the pipe-shaped electrode body at locations about an outer circumference of the electrode body; and
   wherein providing the electrode assembly further comprises:
      forming a plurality of flutes formed on an outer surface of the electrode body, the plurality of flutes forming flushing channels to direct a cutting fluid and workpiece debris away from the working end of the pipe-shaped electrode body; and
      positioning a shield member about a portion of the pipe-shaped electrode body, the shield member being spaced apart from the pipe-shaped electrode body to define a gas channel through which a protective gas may be provided down to the working end of the electrode body, so as to prevent oxidation of the core of workpiece material and provide for recycling of the core;
   wherein the shield member does not extend all the way down to the working end of the pipe-shaped electrode body.

* * * * *